…

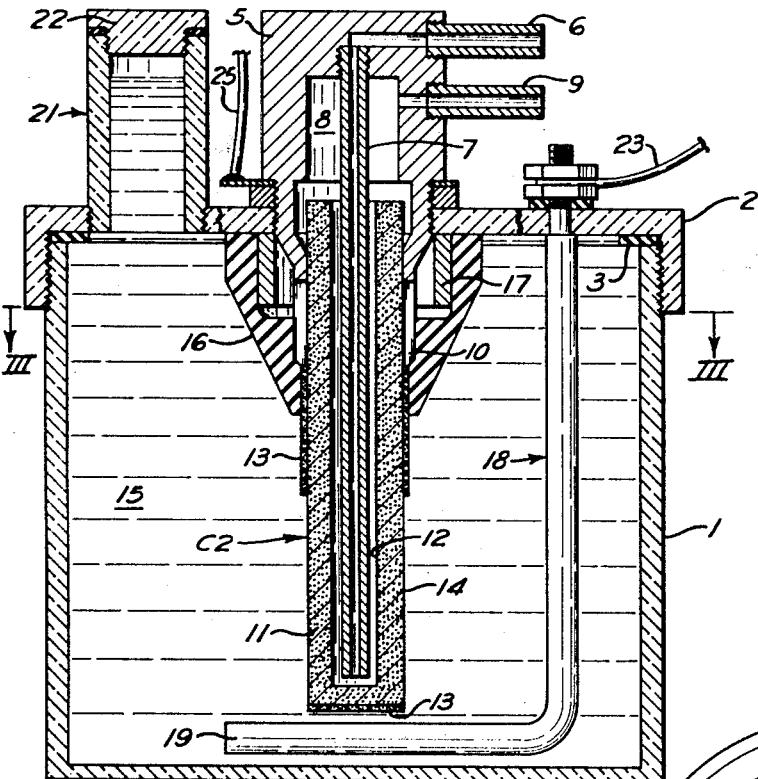
Fig. 2
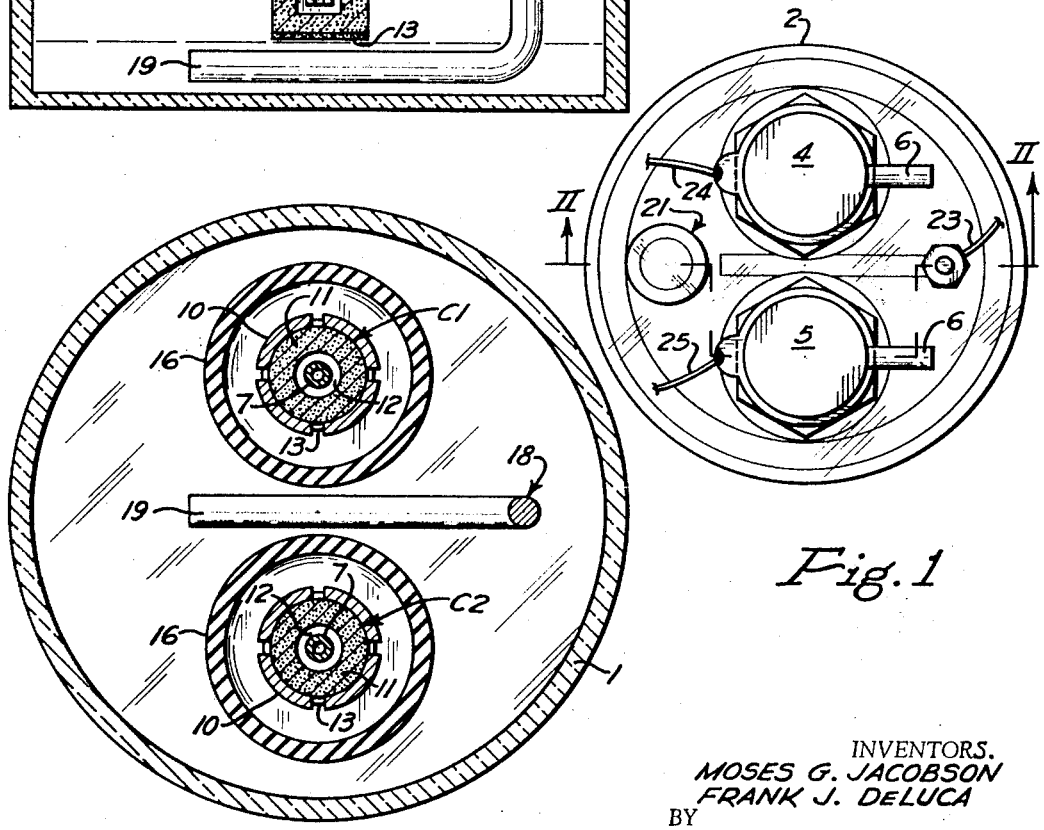
Fig. 3
Fig. 1
INVENTORS.
MOSES G. JACOBSON
FRANK J. DELUCA
BY
Brown, Critchlow, Flick & Peckham
ATTORNEYS.

United States Patent Office 3,455,807
Patented July 15, 1969

3,455,807
GAS DETECTOR
Moses G. Jacobson, Verona, and Frank J. de Luca, Pittsburgh, Pa., assignors to Mine Safety Appliances Company, a corporation of Pennsylvania
Filed Aug. 3, 1964, Ser. No. 386,879
Int. Cl. B01k 3/02
U.S. Cl. 204—195                                    7 Claims

ABSTRACT OF THE DISCLOSURE

A gas detector cell having an anode, an electrolyte and a polarizable cathode, said cathode having a porous wall that is virtually impervious to the electrolyte but pervious to the gaseous mixture. An external source of controllable electric potential is applied across the electrodes, and the cell is characterized by the virtual absence of galvanic action. Another porous cathode is also disclosed.

---

Figure 4:
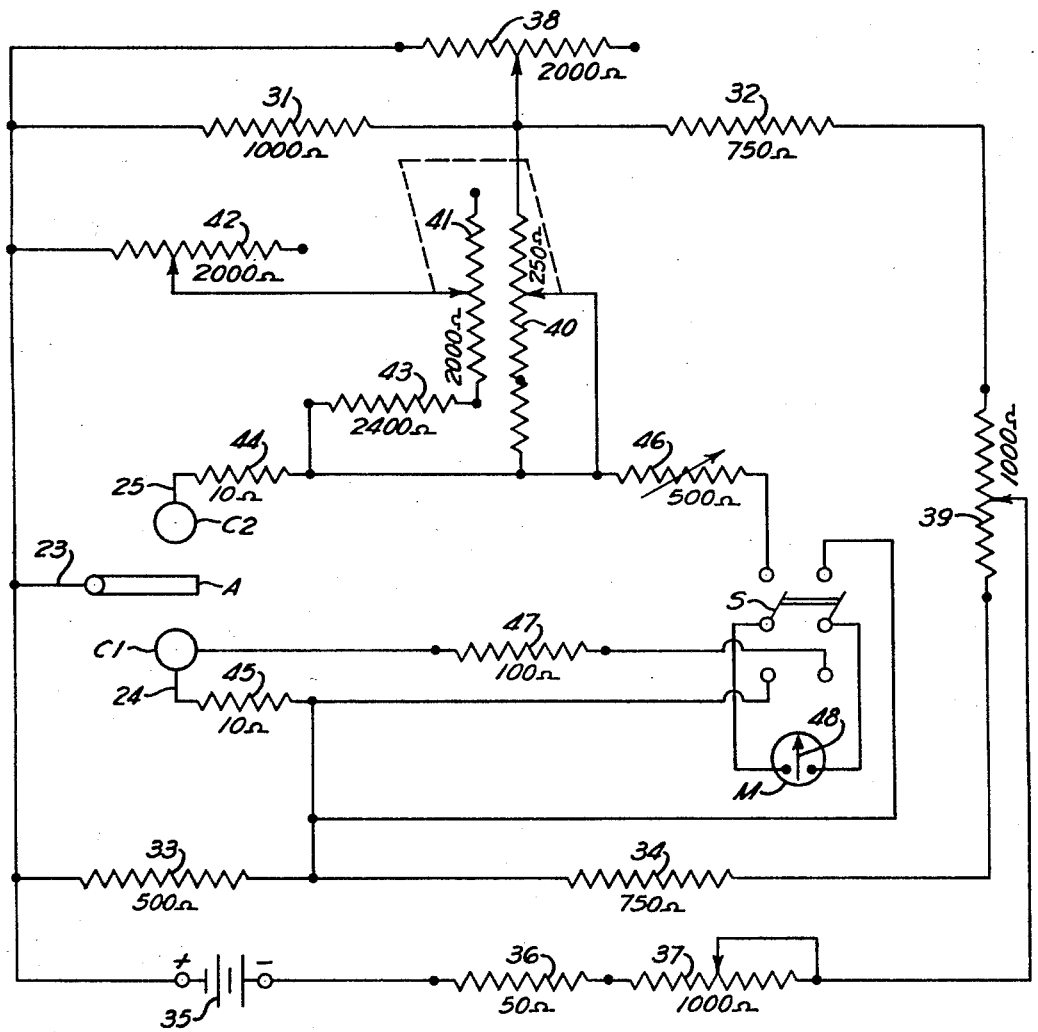

This invention relates generally to the determination of the concentration of components of gas mixtures by electrochemical means that involve the depolarization of a polarizable electrode in an electrolytic cell. The invention is particularly useful in determining oxygen concentrations in gaseous mixtures and, although not limited thereto, will be described herein in connection with determining oxygen deficiencies in air atmospheres as, for example, in mines and submarines to ascertain whether it is safe for a man to enter or remain without auxiliary breathing equipment.

The present invention is an improvement over the inventions disclosed in Patents Nos. 2,939,827 and 3,049,664, in which the present applicants are the inventors. The invention disclosed in the above cited patents involve the use of a galvanic detector cell of the Fery type, comprising a zinc anode, a porous carbon cathode, and an electrolyte of ammonium chloride, in which depolarization of a polarizable cathode depends upon the diffusion of the gas sample through the cathode to the electrode-electrolyte interface and the interaction of the oxygen molecules in the sample with the ions liberated at that interface. An inherent characteristic of such an instrument is that cathode polarization is produced solely by the internal voltage generated in the galvanic cell itself. The attendant disadvantage of this system is that the internal polarizing voltage cannot be accurately controlled, due partly to variations in the internal resistance of the cell and to chemical reactions between the anode and the electrolyte that change the composition of the latter and in time precipitate therefrom particulate matter that may be deposited on the active surface of the cathode, and by the secondary changes produced thereby. These uncontrolled changes in the internal polarizing voltage vary, in turn, the extent of cathode polarization and therefore vary the depolarizing response of a given concentration of oxygen in the sample gas. Likewise, the deposit of particulate matter on the active surface of the cathode may affect the depolarizing response by decreasing the effective electrode-electrolyte interface. Since the depolarizing response of the sample gas is used to measure the oxygen concentration, independent and uncontrollable variations in that response adversely affect the accuracy of the instrument.

It is accordingly among the objects of the present invention to provide electrochemical means for determining the concentrations of depolarizing constituents of gas mixtures involving the use of a depolarizable detector cell that not only will be free of the disadvantages mentioned above, but also will compensate for changes in ambient conditions of temperature and pressure, avoid drift in its response over long periods of time, provide proportionality between its response and actual depolarizing component concentrations, and be useful over a wide range of component concentrations.

The foregoing and other objects of the invention will be apparent from the following description of a preferred embodiment in connection with the attached drawings, in which FIG. 1 is a plan view of the electrolyte detector cell forming part of this invention;
FIG. 2 is a vertical section along the line II—II of FIG. 1;
FIG. 3 is a horizontal section along the line III—III of FIG. 2; and
FIG. 4 is a diagrammatic electrical circuit that includes the above detector cell.

The present invention is predicated on the use of a depolarizable detector cell that has no, or no appreciable, galvanic action and that provides cathode polarization by the application of a polarizing voltage from controllable external source. The invention also includes the use in the same cell of separate depolarizable detector and compensator cathodes that are immersed in a common electrolyte in proximity to a common anode. The invention further contemplates the use of a novel electrical circuit that includes the detector cell and means and methods for zeroing the circuit, for compensating for drift differences between the two cathodes, and for varying the rate of such drift.

Referring to FIGS. 1–3, some elements of the electrolytic detector cell of this invention are similar in physical structure to those described in the patents cited above. The cell includes a cylindrical container 1 of suitable insulation material, such as "Lucite," and a top 2 of the same material that can be screwed on the body. A gasket 3 provides a seal between these two parts. Instead of the single metal head of the former patents, there are now two hollow metal heads 4 and 5, which are identical in all substantial respects and are threadably mounted on the top 2, preferably in a symmetrical arrangement on each side of the central vertical axis of the cell. The lower part of each head projects down into the container and acts as an electrode support. Head 4 supports a cathodic detector electrode C1, and head 5 supports a cathodic compensator electrode C2. These electrodes are similar, so far as concerns their physical characteristics and the way in which they are mounted, and the same reference numerals are used to indicate similar parts and associated mounting elements. Each head is provided with a hose fitting 6, communicating with one end of a tube 7 that extends below the head and well into the container. The hollow space 8 within the head and around tube 7 communicates with a second hose fitting 9. Fittings 6 and 9 are used for admitting and withdrawing (a), in the case of the detector electrode C1, the gaseous mixture, the oxygen content of which is to be determined and (b), in the case of the compensator electrode C2, a standard gas or gas mixture, such as standard atmospheric air. In each case, the direction of gas flow is immaterial.

The lower portion of each head 4 is vertically slotted to form gripping fingers 10 for releasably supporting and effecting electrical contact with a cathodic electrode 11 (i.e., electrode C1 or C2). The electrode is preferably made of the purest carbon available and is of sufficient porosity to permit rapid diffusion of gas between its pores. However other materials may be used besides carbon if they have the required porosity and are otherwise suitable as a cathodic electrode in an electrolytic cell. Each electrode is provided with a central bore 12 extending from the open top of the electrode to within a short distance of its bottom. When the electrode is secured in the head 4, the lower end of tube 7 is received within the bore and extends almost to the bottom of the electrode. The dimensions of the tube and bore are such that there is only a small clearance between the outer wall of the tube and the inner wall of the electrode. A portion of the external surface of each electrode extending below the fingers 10 is coated with a suitable insulation 13, such as varnish, baked enamel, or the like, and the bottom of the electrode is similarly coated, so that only a predetermined area 14 of the electrode between the insulated coatings is exposed to the action of a liquid electrolyte 15 that is contained in the cell. The exposed uncoated surface of the electrode is waterproofed as thoroughly as possible by known waterproofing agents to render it substantially impermeable to the electrolyte, but not to the diffusion of gas from the interior of the electrode to the electrode-electrolyte interface.

To seal the upper portion of the carbon electrode in the lower portion of the head 4 from the electrolyte within the cell, an elastic, cup-like, tubular shield or boot 16 of rubber, or other suitable material, is placed over the insulated portion of the electrode and also over a depending collar 17 secured to the top 2. This collar is preferably made of the same insulation material as the top. The fit of this elastic shield is sufficiently tight to make a complete and effective seal between the electrolyte 15 and the head 4. The shield also cooperates with the insulating areas of the electrode to confine the electrochemical action of the electrolyte to a definite cathode area.

An L-shaped anode 18 of nickel extends through the top 2 and is suspended thereby in the electrolyte with the horizontal bottom portion 19 of the anode extending below and between the electrodes C1 and C2. A preferred electrolyte for a nickel anode is a 3 percent solution of sulfuric acid that contains, in addition, a sufficient amount of nickel sulfate (for example, about 7 grams per 80 cc. of solution) to inhibit chemical reaction between the nickel anode and the sulfuric acid. Generally, the concentration of nickel sulfate should be below the saturation level, at which the cell tends to become somewhat temperature sensitive; yet the concentration should be high enough to inhibit substantially all galvanic action in the cell. It will be understood, of course, that anodes of metals other than nickel can be used with electrolytes containing a salt of the anode material, as well as anodes of non-metallic conductors (as, for example, carbon) with a suitable electrolyte, provided only that the resulting cell is in each case substantially non-galvanic or neutral. The cell is filled with electrolyte through a riser 21, mounted on the top 2 and closed with a threaded plug 22. The use of the riser permits the cell body to be filled completely with the electrolyte and avoids the collection of gases at the top of the cell body above the electrolyte. The cell described above is substantially non-galvanic or neutral, the voltage generated therein being less than 0.1 volt. Because of the nature of the electrodes and the electrolyte and because the applied external voltage is kept low enough, there are no gaseous products of electrolysis liberated; and the cell can be hermetically sealed and does not require a breathing opening found in conventional galvanic cell detectors of this type.

The detector cell is connected by conductors 23, 24, and 25 in the electrical bridge circuit shown in FIG. 4. In this circuit, each of the electrodes C1 and C2, in combination with the common anode A and common electrolyte (not shown), constitutes what may be termed a "half cell." These two "half cells" are connected electrically in parallel with each other and in shunt with parallel bridge arms. The bridge circuit is so designed that, when the two electrodes C1 and C2 are exposed to equal oxygen concentrations—as, for example, that of normal atmospheric air—there will be equal potential drops, though not equal currents, across the two half cells; and the bridge will be balanced, because no current will flow in the bridge diagonal, which contains the indicating meter. In operation, for example, as an oxygen deficiency detector, the interior of the compensator electrode C2 is permanently exposed to a source (not shown) of normal air that is responsive to changes in ambient atmospheric pressure and temperature, and the sample of the ambient air or gas to be tested is passed continuously through the interior of the detector electrode C1 by means of a suitable pump (not shown). If the oxygen content in the sample differs from that of normal air, current will flow in the bridge diagonal and the measurement of that current by the meter will indicate the percentage of oxygen deficiency in the sample. By these means, the effects of pressure, temperature, and residual internal polarization are effectively balanced out, because they are substantially equal in the two half cells and are opposed to each other in the bridge diagonal.

The bridge circuit includes bridge resistors 31–34, an external source of direct current, such as battery 35 of, for example, 3.5 volts; a resistor 36 and rheostat 37 for adjusting the total bridge current and thereby the currents in the two half cells; an adjustable resistance 38 to compensate for small deviations of the bridge arms from standard values; a potentiometer 39 for adjusting the currents in the two half cells to predetermined values that will provide substantially equal polarization and/or depolarization; a rheostat 40 for adjustment of the net polarization-depolarization voltage of the C2 half cell, with a standard gas (e.g., air) at its carbon electrode, to equally with that of the C1 half cell, with the same gas at its carbon electrode, which equality is evidenced by the bridge meter indicating zero current between the two half cells; resistance elements 40–43 are provided for fine control of bridge zeroing and simultaneous correction of drift; the electrode current measuring resistors 44 and 45; an adjustable resistor 46 for adjusting sensitivity; a fixed resistor 47; a meter M; a double-pole, double-throw switch S, for connecting the meter in either a "check" or an "operating" position; and the electrolytic detector cell, represented by the cathodes C1 and C2 and their common anode A.

The external voltage that is applied to each of the half cells will generally be on the order of from 0.3 to 1.5 volts, the maximum voltage being less than that which would cause the anode metal to plate out from electrolyte. The current and voltage actually applied in operation to each of the half cells may be adjusted in three ways: one, by means of rheostat 37, the total voltage applied to the bridge, and hence the currents through the two half cells, can be adjusted to a standard value against any changes in battery voltage; two, when a new pair of electrodes is inserted in the cell, the separate currents through each of the bridge arms and the two half cells can be adjusted by means of potentiometer 39, which acts a current divider to the proper values that have been determined by preliminary tests to provide equal depolarization of the two electrodes for equal changes in oxygen concentration; three, by means of rheostat 40, the voltage across half cell C2 can be finely adjusted to equal the voltage across half cell C1, with both electrodes exposed to the same standard gas, which will result in a zero net current between C2 and C1 when they are connected in opposition through the meter by throwing switch S to its "operating" position.

A basic object of the circuit design is to minimize the effect on the rest of the circuit, including the compensator electrode C2, of the current and voltage changes produced by a change in oxygen concentration at the detector electrode C1. For that purpose, the detector half cells are placed not directly in two adjacent bridge arms but in shunt across two parallel bridge arms. Ideally, the resistances of these two bridge arms should be as small as possible with respect to the effective resistances of the half cells shunting them, so that any electrical changes in the detector half cell C1, from the largest likely change in oxygen concentration, would have no significant effect on the rest of the circuit. The exemplary circuit described in this application was made for a portable oxygen deficiency instrument, in which the stated values of the various resistances in FIG. 4 are based on the use of a small 3.5 volt battery 35 as the external voltage source. In this circuit, the effective resistances of the half cells in air are of the order of 500 ohms; and bridge resistances 31 and 33 in shunt with the half cells have the values shown in FIG. 4, which are small enough to keep the voltages applied to the detector half cell C1 from the bridge arm substantially constant against changes in oxygen concentrations from 21 percent down to at least 12 percent. This range is adequate for oxygen deficiency testing. To provide about the same voltage drop across the half cells in an instrument having a higher external voltage source, the value of resistances 31 and 33 would be much smaller. As a result of this circuit arrangement, in combination with the use of detector and compensator cathodes and other circuit features, proportionality of meter reading with oxygen concentration change is obtained in contrast with former instruments using the depolarization method.

The circuit described herein is designed to permit adjustment of the circuit parameters so as to obtain equal polarization in each half cell, so as to assure equal depolarization therein when electrodes C1 and C2 are exposed to a gas of the same oxygen concentration. In this circuit, there is a minimum of drift in the parameters of each half cell and an extremely small drift in the net output, which is always equal to the difference of the respective parameters in the two half cells.

In order to obtain the same depolarization in each half cell when their electrodes C1 and C2 are exposed to the same oxygen concentration, these electrodes must be properly selected. This is done by testing their electrical characteristics in a standard cell connected in a standard circuit of the type herein described. All the carbon electrodes are made and processed to provide a minimum standard depolarizing response, as, for example, 5 microamperes for each 1 percent change in oxygen concentration. However, the electric current through the half cell necessary to obtain this response may vary considerably from electrode to electrode. It is the main task in selecting the electrodes for use in a given cell to determine the value of the electric current (with the electrodes exposed to air or another standard gas) that will provide exactly the required standard response. By extensive experiment, we have found that this current value is a definite characteristic for the given electrode and remains constant indefinitely, either in storage or in use. Therefore, each electrode selected by these tests is identified with the current necessary to obtain the standard response in the instrument described, and the electrode is then tagged with the microampere reading obtained when the meter in the standard bridge circuit is switched into the "check" position shown in FIG. 4. In this connection, it s desirable that meter M have a center zero scale, in which the pointer 48 is at the center of the scale when there is no current in the bridge diagonal, i.e., zero current equals 21 percent oxygen. The scale to the left of that point (read in the "operating" position of switch S) is graduated in percentages of oxygen below 21 percent, and the scale to the right of that point (read in the "check" position of switch S) is graduated in microamperes. This scale arrangement avoids confusion between the two readings; and, in case a deficiency oxygen alarm is included in the circuit, this arrangement prevents a false alarm in the "check" position of switch S or the need of an additional switch to cut out the alarm circuit.

It has been observed that, if good operation is to be obtained, the two cathodes used as a pair in the common cell must not differ in their tag currents more than by a certain amount that is determined by the parameters of the bridge circuit. In the circuit here described, the maximum permissible "tag" difference, expressed in their "check" readings is 6 microamperes. Therefore, each two electrodes to be used as a pair in the present cell should be selected subject to this condition.

After a pair of selected cathode electrodes is inserted in the cell, an initial adjustment of the circuit is carried out with both electrodes exposed to a standard air atmosphere. With rheostat 40 at about the midpoint of its range, switch S is turned to the "check" position; the meter will then indicate a current value which is proportional to the actual current going through electrode C1, the detector half cell. If this current differs from the tag value for the detector electrode, adjustment to the tag value is made with rheostat 37. Then the meter is switched back into the "operating" position, and the bridge is balanced by potentiometer 39, i.e., the potentiometer is adjusted until there is zero current in the bridge diagonal. In this condition, 21 percent oxygen concentration will be indicated on the scale. If a considerable adjustment of potentiometer 39 has to be made, it is usually desirable to repeat the foregoing procedure, that is, to adjust to the proper check value with rheostat 37, and then readjust exactly to zero bridge diagonal current, or 21 percent oxygen, by potentiometer 39 and rheostat 40.

After this initial adjustment of the circuit to a given pair of electrodes as described above, the instrument is ready for use. It has been found that if the instrument is left on for 24 hours, that is, if the external voltage is continuously applied to the cell for that period, the net drift of the instrument will be less than ±0.4 percent oxygen in 4 hours. The drift will slowly decrease further to 0.07 percent oxygen in 4 hours if the cell is left continuously on current for a few days. This decrease in drift results from the fact that the drift of each half cell is almost the same and is opposed to that of the other cell in the bridge circuit. The circuit also includes means for decreasing the drift even further and more quickly. An arrangement is incorporated in the measuring circuit whereby each time that the bridge is zeroed, by adjusting rheostat 40, a simultaneous decrease is made in the rate of drift of the compensator cathode C2. This is accomplished by the drift compensation circuit comprising a rheostat 41, and adjustable resistor 42, and a limiting resistor 43. Rheostat 41 is controlled by the same shaft as rheostat 40. In this arrangement, rheostat 40 corrects for the actual drift that has already occurred and rheostat 41 and adjustable resistor 42 change the rate of drift in the compensator half cell by putting more or less of a shunt across it, so as to make its drift more nearly equal to the drift in the detector half cell, and in this way the net drift rate will be decreased by each successive simultaneous adjustment of rheostats 40 and 41. It should be pointed out that the adjustment of the zeroing rheostat 40 does not substantially affect any circuit parameter other than the current through electrode C2, and that only slightly. Specifically, it does not affect significantly the current through electrode C1, nor the balance of the bridge arms.

When using the instrument described herein, the measuring circuit is in operative condition at all times so long as battery 35 is connected in the circuit. The battery drain is negligible and has a negligible effect on the stability of the measuring circuit. Before entering a mine or other area where there is a question whether the atmosphere contains a normal oxygen concentration, and while still in an atmosphere of normal air, the following preliminary checks should be made: Switch S is first moved to the "check" position and the detector cathode C1 is exposed, by the operation of a suitable pump (not shown), to a sample of normal air. The compensator cathode C2 is, of course, permanently exposed to a sealed source of normal air. If necessary, rheostat 37 is adjusted to bring the current value, as indicated on the right hand side of the scale of meter M, to the value specified or tagged for the particular carbon electrode C1 that is in the cell. Switch S is then moved to its operating position, and the meter pointer adjusted to 21 percent (i.e., zero net current in the bridge diagonal) by means of rheostat 40. It is generally desirable to repeat the above steps after 5 or 10 minutes. The instrument is now ready to be used in test a questionable atmosphere by exposing the cathode C1 to a sample thereof and reading the oxygen deficiency on the left hand side of meter M.

It is among the advantages of this invention that, because the detector cell develops no significant galvanic action, polarization is produced substantially exclusively by current from an external source. This arrangement permits excellent control over polarization and, therefore, also over depolarization that directly determines the electrical response (sensitivity) to a given change in oxygen concentration. As a result, the detector cell of this invention not only has increased sensitivity, but greater stability and longer trouble-free life, than the usual galvanic detector cell.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In an apparatus for the electrochemical determination of the concentration of a depolarizing component of a gaseous mixture, the combination comprising a detector cell having an anode and a polarizable cathode adapted to be contacted by an electrolyte, the last element having a porous wall that is substantially impervious to the electrolyte but pervious to the gaseous mixture and adapted to be contacted thereby and that is polarizable and depolarizable at its electrode-electrolyte interface, an external source of controllable electric current applied across said electrodes for polarizing the cathode, said cell being characterized by the virtual absence of galvanic action, a second polarizable cathode in the detector cell that is adapted to be contacted by said electrolyte and by a standard gas but is otherwise similar to the first cathode, the two cathodes in combination with said electrolyte and common anode forming two electrolytic half cells, and means for applying through each half cell from said external source a polarizing current that will result in equal depolarization in each half cell when the cathodes of those cells are exposed to equal changes of concentration of a given depolarizing gas.

2. Apparatus according to claim 1, in which said means for applying a polarizing current include a bridge circuit wherein each half cell is shunted across a separate parallel arm of the bridge, and in which said external current source is connected across the bridge through potentiometer means that act as a current divider between the two half cells.

3. In an apparatus for the electrochemical determination of the concentration of a depolarizable component of a gaseous mixture, the combination comprising a detector cell having a detector cathode and a compensator cathode and an anode, the two cathodes being adapted to combine with their common anode and an electrolyte to form two electrolytic half cells, each cathode having a porous wall that is substantially impervious to the electrolyte but pervious to a gas, the detector cathode being adapted to be contacted by the gaseous mixture to be tested and the compensator cathode being exposed to a source of standard gas at substantially the same pressure and temperature as the gaseous mixture, each cathode being polarizable and depolarizable at its electrode-electrolyte interface, an electrical circuit that includes a Wheatstone bridge, in which each half cell is shunted across a separate and parallel bridge arm, and an external source of electrical current connected across the bridge and rheostat means for controlling the total current passing through said half cells from said external source, each of said half cells being characterized by the virtual absence of galvanic action.

4. Apparatus according to claim 3, that also includes potentiometer means for controlling the current passing through each half cell from said external source.

5. Apparatus according to claim 3, that also includes rheostat zeroing means connected in the bridge diagonal and in series with the half cell that contains the compensator cathode.

6. Apparatus according to claim 3 that also includes drift correction rheostat means shunted across the half cell containing the compensator cathode, for correcting for differences in drift between the two cathodes.

7. Apparatus according to claim 6, that also includes rheostate zeroing means connected in the bridge diagonal and in series with the half cell that contains the compensator cathode, which the zeroing rheostat and the drift correction rheostat are mechanically coupled for simultaneous operation, whereby the correction of existing drift by means of the zeroing rheostat will result in simultaneous correction of the rate of drift by means of the drift correction rheostat.

References Cited

UNITED STATES PATENTS

| 2,851,654 | 9/1958 | Haddad | 204—195 |
| 2,939,827 | 6/1960 | Jacobson et al. | 204—195 |
| 3,216,911 | 11/1965 | Kronenberg | 204—1.1 |
| 3,247,452 | 4/1966 | Kordesch | 204—195 |
| 3,291,705 | 12/1966 | Hersch | 204—195 |
| 3,296,113 | 1/1967 | Hansen | 204—195 |
| 3,313,720 | 4/1967 | Robinson | 204—195 |

JOHN H. MACK, Primary Examiner

T. TUNG, Assistant Examiner

U.S. Cl. X.R.

204—1